July 22, 1958     R. C. WALLER ET AL     2,844,487
PROCESS FOR DIPPING RAYON CORD
Filed May 19, 1954
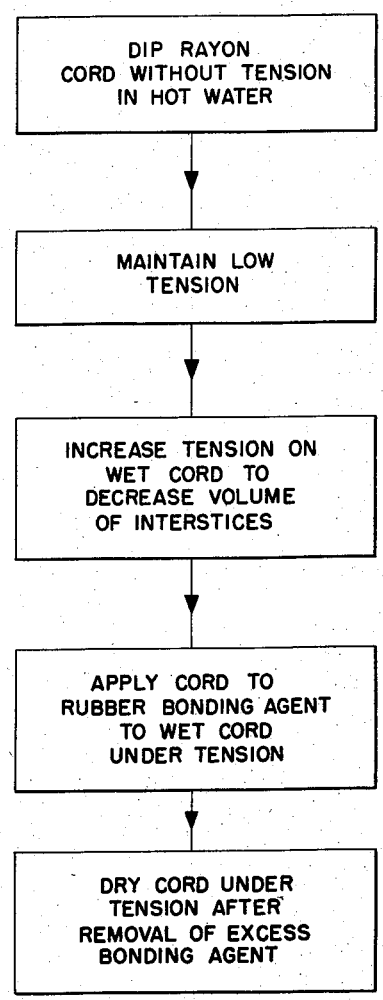
INVENTOR.
RICHARD C. WALLER
DANIEL D. RAY
BY
ATTORNEY

United States Patent Office 2,844,487
Patented July 22, 1958

2,844,487
PROCESS FOR DIPPING RAYON CORD

Richard C. Waller, Cuyahoga Falls, and Daniel D. Ray, Kent, Ohio, assignors to The Goodyear Tire & Rubber Company, Akron, Ohio, a corporation of Ohio Application May 19, 1954, Serial No. 430,996

1 Claim. (Cl. 117—7)

This invention relates to a method for treating rayon yarns, cords, fabric and the like to be used in the manufacture of tires, belting and similar products. More particularly, the invention relates to a method of treating rayon continuous-filament synthetic yarns or cords to be imbedded in rubber to form a cord to rubber assembly having improved resistance to flex fatigue, improved resistance to the diffusion of air through the axially extending interstices of the cord and greatly improved cord strength.

Because rayon filaments are formed by extrusion they have a smooth surface, and it is a well known fact that rayon yarns, cords and fabric must be treated with a cord to rubber bonding agent, or adhesive, in order to effect a good bond between the cord and rubber. In the manufacture of tires, belting and similar products, many type of adhesives and methods of treating rayon cord with adhesives have been suggested and are being used to improve not only adhesive strength but other characteristics of the cord. These methods are primarily directed to increasing one of the following characteristics: the cord strength, elongation, modulus or elasticity or flexibility of the cord to rubber assembly. Unfortunately, however, methods directed to increasing one of these characteristics, paradoxically, adversely affects one or more of the other characteristics. For example, a low degree of adhesive penetration favors cord strength and cord flexibility but adversely affects adhesion between the cord and rubber. Conversely, a high degree of adhesive penetration increases adhesion but tends to over-load the outermost filaments so as to completely fill the interstices with solids and thereby decreases the flexibility of the cord and the cord strength.

The problem of processing tire cord to obtain optimum characteristics is further complicated by the fact that manufacturers of tires and similar products, of necessity, obtain fabric from several sources. The dipping characteristics of the fabric varies, not only between sources but also between batches obtained from the same source, due to the variations in the processing and the type of fabric finish applied by the fabric manufacturer. For example, the tire manufacturer is confronted with the problem of treating fabrics some of which have hydrophobic finishes and some of which have hydrophilic finishes.

An object of this invention is to provide a method of treating cord to improve the cord strength, flex fatigue resistance, resistance to air diffusion, and to maintain high cord adhesion and elongation characteristics.

A further object of the present invention is to provide a method of treating continuous-filament cords and bonding them to rubber whereby the bonding agent is applied to the cord in a gradient of concentrations toward the center of the cord, to improve resistance to flex fatigue and resistance to the diffusion of air while increasing the cord strength and maintaining good adhesion and elongation properties.

The bonding agents or adhesives referred to in this specification are those which consist of: (1) a rubber latex, (2) an aqueous dispersion or a solution of a resin, (3) an aqueous dispersion of a protein, or (4) mixtures containing two or more of the above ingredients. Examples of the protein material usable in these cord to rubber bonding agents are: casein, gelatin, wheat protein, animal glue, albumin, hemoglobin, preferably those having low viscosity such as fish glue or animal blood. Examples of the rubber latices which may be employed are natural rubber latex, synthetic rubber latices such as those resulting from the polymerization of butadiene with styrene. Examples of suitable resins which may be employed are thermosetting soluble aldehyde resins or an aldehyde with a reactant capable of forming a thermosetting resin with the aldehyde.

The term rubber, unless otherwise modified, is intended to be used in its generic sense to include natural rubber, compounded rubber, synthetic rubber and the like.

The method of treating rayon cords of the present invention consists of dipping the cord in a relaxed condition in hot water, maintaining the cord in a relaxed condition until the cord is thoroughly wet and shrunk, compacting the cords by increasing the tension thereon, removing excess water, dipping the cord in a solution of a cord to rubber bonding agent and drying the cord under the increased tension.

If the cord has the characteristic of shrinking in water, no attempt is made to prevent it during the hot water dip. Since the cord is in a relaxed condition or under very low tension of less than .01 and preferably approximately .007 grams per denier during and after the initial dip, the volume of the interstices is increased and the degree of penetration and rate of wetting is increased. The hot water at a temperature in the range of 120° to 190° F., preferably 160° F., softens or dissolves any hydrophobic finish which retards penetration of liquid into the cord. A low tension is maintained for a sufficient length of time after the dip to permit complete wetting out of the cord. As a result of the low tension during and after the dip and the temperature of the water, the wetting out rate is materially increased so that commercially available cord may be completely wetted in less than three minutes. At this point in the process the cord filaments are in a plasticized and wet condition and any internal stresses existing before treatment with the hot water are relieved so that the cord is supple and pliable.

After the hot water treatment, the cord is subjected to increased tension while still in a wet and plasticized condition. The tension is increased up to several times the tension applied during the first dip, and to at least an amount sufficient to stretch the cord to its original length. Since the rayon cord is plasticized by the hot water, a relatively slight increase in tension will compact and align the filaments of the cord into a better geometric lay than originally. Because of the supple and pliable condition of the cord filaments during the compacting step, the filaments readily slip past each other into a better geometric lay and more compact position without interference from frictional forces.

As a result of the wetting and compacting steps described above the tensile strength of the cord is materially increased. The unexpected increase in tensile strength is a result of an equalization in the distribution of load applied axially of the cords. An untreated rayon cord is made from continuous filaments laying in a helical path parallel to each other. In any given length of cord the helical path lengths of the filaments are unequal and as axial force is applied to the cord a step-like breaking of the individual filaments occurs so that the ultimate tensile strength is relatively low. Applicant has discovered that the geometric lay of the helically extending filaments may be improved by a thorough wetting out under low tension and stretching of the cord so that the lengths of the individual filaments are equalized and the cord strength thereby increased.

While maintaining increased tension, the excess hot water is wiped or drained off and the yarn is then subjected to the application of a cord to rubber bonding agent having a sufficient concentration of solids to produce an extremely good bond between the rubber and the cord. The range of solids in the second dip is between 15 and 25% by weight, preferably approximately 20%. Since the cord has been thoroughly wetted with hot water prior to the adhesive dip, the penetration of adhesive into the cord is substantially independent of the type of finish originally applied to the cord. Moreover, the amount of adhesive picked up by the cord during the second dip is controlled, i. e., the volume of the interstices is reduced by the compacting step and the water existing in the interstices of the cord prior to the adhesive dip tends to dilute the concentrated adhesive dip so that a gradient of concentrations of solids outwardly from the center of the cord is effected which greatly improves resistance to flex fatigue of the cord.

After the second dip is applied, the cord is heated without decreasing the tension so as to evaporate the water and set or harden the bonding agent. Thereafter, the tension is released and the cord is imbedded in commercially compounded rubber stock or known methods of calendering to form a cord and rubber assembly to be used to build tires, belts and similar articles which are subsequently cured at a high pressure and at elevated temperatures. Cords treated according to the methods of this invention exhibit not only increased tensile strength and resistance to flex fatigue but also improved resistance to the rate of diffusion of air axially through the cords. The compacting step reduces the volume of the interstices of the cord and the controlled penetration of the preferred range of solids in the second dip intermittently dams the interstices of the cord to reduce the rate of air diffusion axially through the cord.

Although best results are obtained by practicing the preferred embodiment of this invention as described above, improvements are effected in the strength of the cord, resistance to diffusion of air through the axially extending interstices, and in the resistance to flex fatigue of the rubber and cord assemblies by modifying the preferred process to the extent that the compacting tension is applied during or subsequent to the second dip, rather than immediately prior thereto. However, in any event, the tension is increased prior to the drying operation so that the filaments are aligned while the cord is thoroughly wet.

In order to more clearly illustrate the advantages and scope of this invention, rayon test cords are dipped in a hot water pre-dip and a second dip containing an aqueous solution of resorcinol formaldehyde and latex having a total solids content of 20% by weight. In order to establish a control cord to which the test cords might be compared, the rayon cords are dipped in the second dip of high solids concentration, dried, imbedded in rubber, and submitted to the same tests as the cord dipped according to the present invention. The tensile strength of the cords is measured by submitting the cords to a constantly increasing load and recording the load necessary to break the cord. The flex fatigue resistance tests are conducted by subjecting the rubber and cord assembly to a constant flexing or bending force and recording the number of cycles before separation of the cord from the rubber. The rate of diffusion of air axially through the cords is measured by submitting the cord and rubber assemblies to axial air pressure of 20 p. s. i. and measuring the volume of air which passed axially through the cord per unit of time. The following data show that the cord samples having a greige cord strength of 14.2 lbs. dipped according to the present invention exhibit an increase in tensile strength over the greige cord, whereas, dipped cord normally exhibits a decrease in tensile strength. In addition, the resistance to flex fatigue and the resistance to the diffusion of air through the cord is substantially increased:

[Greige cord tensile strength 14.2.]

|  | Control Cord | Cord A |
|---|---|---|
| Tensile (lbs.) | 13.7 | 14.7 |
| Elongation (percent) | 9.5 | 9.5 |
| Flex Resistance (KC) | 74.8 | 97.0 |
| Adhesion (lbs.) | 11.0 | 12.5 |
| Air Diffusion Rate (cc. per min.) | 701.0 | 204.0 |

In order to illustrate the advantage of the present invention over conventional dipping methods with respect to the effect on the tensile strength of the cord, a series of rayon cords are dipped in a single dip of highly concentrated adhesive and the tensile strength of the control cords are compared with corresponding samples of cord dipped according to the present invention. The following data show that the samples dipped according to the present invention exhibit an increase in tensile strength over conventionally dipped cord:

|  | Tensile Strength (lbs.) Control Cords | Tensile Strength (lbs.) Sample Cords |
|---|---|---|
| Cord A | 13.6 | 14.0 |
| Cord B | 19.6 | 21.3 |
| Cord C | 13.7 | 14.7 |
| Cord D | 17.0 | 19.0 |
| Cord E | 11.6 | 12.2 |

Another series of cords from several manufacturing sources were tested and a measure of the rate of diffusion of air axially through the cord was taken in a manner similar to that described above. At 20 lbs. pressure an average of 119 cc. of air was diffused through the cords dipped according to the present invention and an average of 519 cc. of air at 20 lbs. of pressure was diffused through the control cords.

It is of primary importance to the successful practice of this invention, that the cord is not dried between the first and second dips. Drying the cord at that time materially decreases the strength of the cord, and the resistance to the diffusion of air axially through the cord, because the cord will not be plasticized so that the individual filaments may be easily compacted into an improved lay during the application of the increased tension. Moreover, if the cord is dried between the dips the bonding agent of the second dip will not be dispersed in a gradient of concentrations decreasing towards the innermost filaments thereof.

From the foregoing, it is seen that this invention provides an economical method of treating cords, yarns, or fabric to improve the strength of the cord but also makes possible the preparation of cord and rubber assemblies having uniformly high resistance to the diffusion of air axially through the cord and uniformly high resistance to flex fatigue without impairing other physical properties of the cord and rubber assembly. Cord dipped according to the present invention imparts a longer useful life to articles such as tires, belts and the like. Since high resistance to the diffusion of air axially through the cord is effected, the cord is particularly useful in the making of tubeless tires, wherein the retention of air solely by the carcass of the tire is of paramount importance to their practicality.

While certain representative embodiments and details have been shown for the purpose of illustrating the invention, it will be apparent to those skilled in this art that various changes and modifications may be made therein without departing from the spirit or scope of the invention.

We claim:

A method of treating rayon cord which is to be imbedded in rubber comprising dipping continuous filament rayon cord in hot water in a substantially tensionless condition, maintaining the cord in a tensionless condition during and after the hot water dip until the cords are plasticized and the interstices between the cord filaments are filled with water, increasing the tension of the thus wetted and plasticized cord to decrease the volume of the interstices between the filaments of the cord, applying an aqueous solution of a cord to rubber bonding agent to the thus wetted and plasticized cord, and while said cord is under said increased tension, of a concentration of 15 to 25% by weight to form a cord to rubber bond, removing excess bonding agent from the cord, and drying the cord while under said increased tension.

References Cited in the file of this patent

UNITED STATES PATENTS

| | | |
|---|---|---|
| 2,314,976 | Gazdik | Mar. 30, 1943 |
| 2,372,601 | Nickerson | Mar. 27, 1945 |
| 2,606,844 | Wilson | Aug. 12, 1952 |
| 2,790,736 | McLaughlin | Apr. 30, 1957 |